United States Patent
Hermann et al.

(10) Patent No.: US 10,081,029 B2
(45) Date of Patent: Sep. 25, 2018

(54) PAINT MIST SEPARATING DEVICE

(71) Applicant: ABB Technology AG, Zurich (CH)

(72) Inventors: Daniel Hermann, St. Anna (AT); Wernfried Heinrich, Düsseldorf (DE); Marcus Schnaubelt, Friedberg (DE); Frederik Vandepitte, Reiskirchen (DE)

(73) Assignee: ABB SCHWEIZ AG, Baden (CH)

( * ) Notice: Subject to any disclaimer, the term of this patent is extended or adjusted under 35 U.S.C. 154(b) by 1119 days.

(21) Appl. No.: 13/909,579

(22) Filed: Jun. 4, 2013

(65) Prior Publication Data

US 2013/0319323 A1    Dec. 5, 2013

(30) Foreign Application Priority Data

Jun. 5, 2012   (EP) .................................... 12004287

(51) Int. Cl.
| | | |
|---|---|---|
| *B05B 15/12* | (2006.01) | |
| *B01D 50/00* | (2006.01) | |
| *B01D 45/06* | (2006.01) | |
| *B01D 45/08* | (2006.01) | |
| *B05B 14/44* | (2018.01) | |
| *B05B 14/40* | (2018.01) | |

(52) U.S. Cl.
CPC .......... *B05B 15/1259* (2013.01); *B01D 45/06* (2013.01); *B01D 45/08* (2013.01); *B01D 50/002* (2013.01); *B05B 14/40* (2018.02); *B05B 14/44* (2018.02)

(58) Field of Classification Search
CPC ............ B05B 15/1225; B05B 15/1229; B05B 15/1259; B01D 45/06; B01D 45/08; B01D 50/002
See application file for complete search history.

(56) References Cited

U.S. PATENT DOCUMENTS

| | | | | |
|---|---|---|---|---|
| 3,138,087 | A * | 6/1964 | Larsson et al. | 96/363 |
| 3,813,856 | A * | 6/1974 | Jensen | 55/444 |
| 4,220,078 | A * | 9/1980 | Walker et al. | 454/54 |
| 4,440,554 | A * | 4/1984 | Perry | 96/323 |
| 6,024,796 | A * | 2/2000 | Salazar | B05B 15/1262 118/326 |

* cited by examiner

*Primary Examiner* — Dah-Wei D. Yuan
*Assistant Examiner* — Stephen A Kitt
(74) *Attorney, Agent, or Firm* — Barnes & Thornburg LLP

(57) ABSTRACT

The disclosure relates to a paint mist separating device, and a paint booth having a paint mist separating device. The paint mist separating device can include a tapered tube, and a collecting funnel with a funnel inlet and a funnel neck, into which the larger end of the tapered tube projects, wherein the funnel neck is provided for connection to a collecting tank for paint. The paint mist separating device can include a collecting hood, which is arranged opposite the funnel inlet and which has a paint mist inlet opening, into which a smaller end of the tapered tube opens, wherein an outlet gap is provided between the inlet opening of the collecting funnel and the collecting hood.

15 Claims, 3 Drawing Sheets

PAINT MIST SEPARATING DEVICE

RELATED APPLICATION(S)

This application claims priority under 35 U.S.C. § 119 to European Patent Application No. 12004287.4 filed in Europe on Jun. 5, 2012, the entire content of which is hereby incorporated by reference in its entirety.

FIELD

The disclosure relates to a paint mist separating device and to a paint booth having a paint mist separating device.

BACKGROUND INFORMATION

Known painting devices can include atomizers for painting workpieces. During the painting process, these atomize a liquid coating material into a multiplicity of very small droplets, for example, in a range of from 5 µm to 50 µm droplet diameter, which are then directed towards the workpiece to be painted, such as by an air stream emanating from the atomizer. The mixing of the paint droplets or paint particles with the air gives rise to a paint mist during the operation of the painting device. Examples of atomizers of this kind are air atomizers or rotary atomizers.

An industrial painting process can take place in a paint booth, in which suitable climatic conditions can be maintained. For example, paint booths have devices for cleaning the air in order to free the ambient air in the booth from the portion of the paint particles atomized which do not reach the workpiece during the painting process owing to the level of efficiency, for example, and to make available the air cleaned in this way again at a desired temperature, for example, 24° C.

However, paint mist can also be introduced into the ambient air in the booth during a change of color or during an "initial pressurized infeed" operation, for example. It is desirable for cleaning purposes, when changing the color, to force residues of the original coating material forwards out of the paint supply system through the atomizer, subsequently to do the same with a cleaning agent and then to feed the new coating material in under pressure. This takes place in the paint booth. During this process, the coating material and/or solvent is only partially atomized and carried into the ambient air in the paint booth. Owing to switching operations or indeed startup or braking operations, for example, in the case of a rotary atomizer, there are therefore relatively large droplets of paint or solvent in the paint mist produced in this way.

To remove paint or solvent mist from the ambient air in the booth, use is made of devices called separators, which ultimately filter out the paint particles as waste, which then can be disposed. "Wet" and "dry" separators can be used. In the case of wet separators, the paint particles are initially introduced into a wash-out-system water circuit that can be provided, after which the paint particles are removed from the water. The waste which arises is then separated from the water and disposed of as paint sludge.

In some respects, dry separators can be advantageous compared with wet separators, particularly because there is no need to provide a water circuit. Moreover, drying of the air made humid by the water circuit in the case of wet separators can be eliminated, and therefore dry separators can also prove advantageous in terms of energy considerations.

However, the filtering effect of dry separators can be less effective, especially in the case of droplets of coating material of relatively large diameter, and therefore increased contamination of the painting installation and/or of the air-conditioning system can occur during prolonged operation. This is because dry separation can involve the use of a powdered binder, with the result that separation can be inadequate in the case of large particles or droplets owing to the relatively small area of contact between the binder and the paint particles in that case. The paint mist which is introduced into the ambient air in the booth during a change of color, containing as it does some paint particles or droplets which are of significantly larger size, therefore can present issues for dry separation.

Exemplary embodiments can provide a device by which the paint mist which arises during a change of color and/or during the initial pressurized infeed to an atomizer can be freed at least partially from paint particles.

SUMMARY

A paint mist separating device is disclosed, comprising: a tapered tube; a collecting funnel with a funnel inlet and a funnel neck, into which a larger end of the tapered tube projects, wherein the funnel neck is provided for connection to a collecting tank for paint; and a collecting hood arranged opposite the funnel inlet, the collecting hood having a paint mist inlet opening, into which a smaller end of the tapered tube opens, wherein an outlet gap is provided between the inlet opening of the collecting funnel and the collecting hood.

A paint booth is disclosed, comprising: at least one painting device; and a dry separation system including at least one paint mist separating device having: a tapered tube; a collecting funnel with a funnel inlet and a funnel neck, into which a larger end of the tapered tube projects, wherein the funnel neck is provided for connection to a collecting tank for paint; and a collecting hood arranged opposite the funnel inlet, the collecting hood having a paint mist inlet opening, into which a smaller end of the tapered tube opens, wherein an outlet gap is provided between the inlet opening of the collecting funnel and the collecting hood.

BRIEF DESCRIPTION OF THE DRAWINGS

The disclosure, further embodiments and further advantages are described in greater detail by way of reference to the illustrative embodiments shown in the drawings, in which.

DETAILED DESCRIPTION

Figure 1:
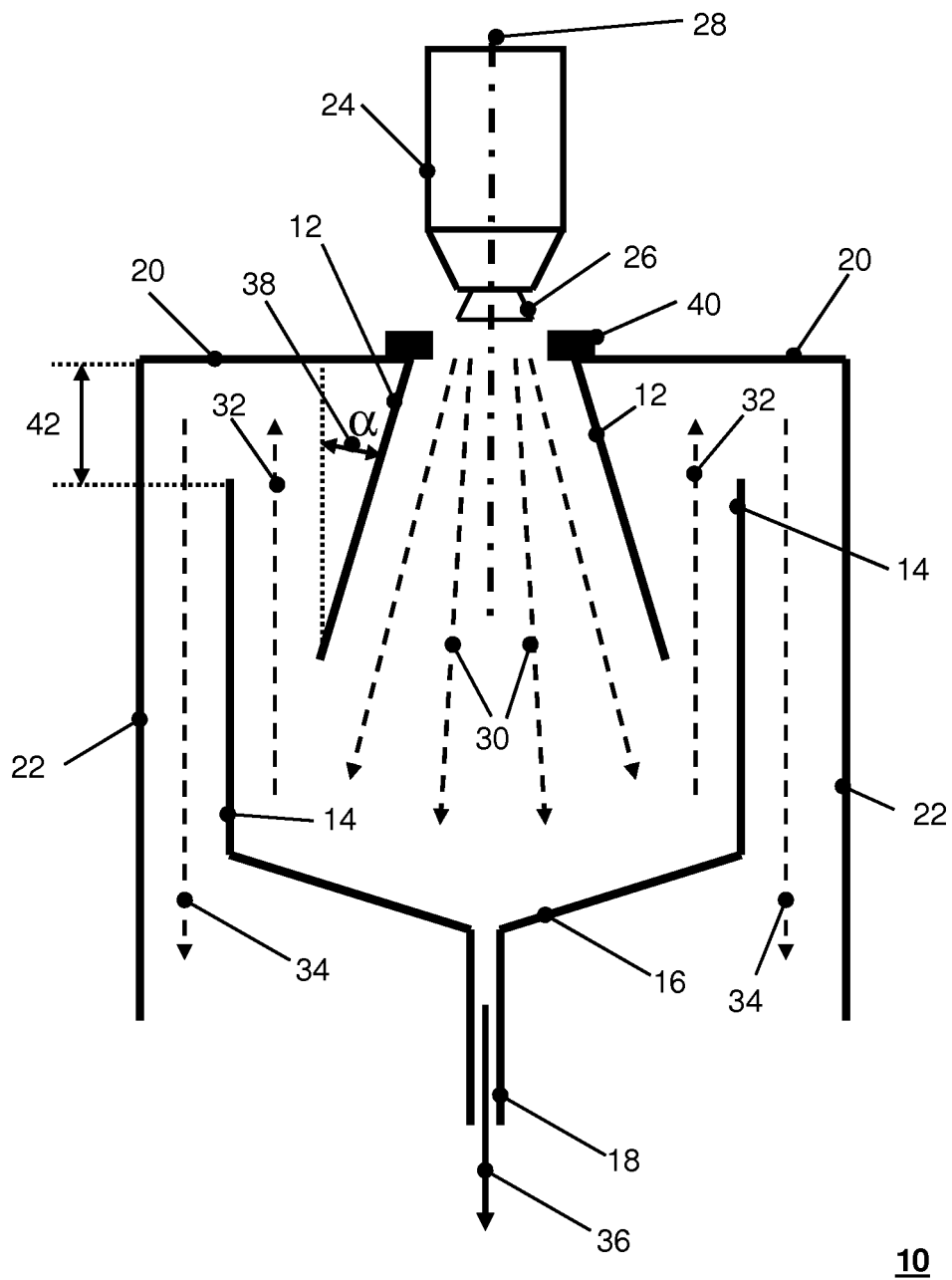
FIG. 1 shows an illustrative paint mist separating device according to an exemplary embodiment of the disclosure.

A paint mist separating device according to an exemplary embodiment of the disclosure includes a tapered tube, a collecting funnel with a funnel inlet and a funnel neck, into which the larger end of the tapered tube projects. The funnel neck is provided for connection to a collecting tank for paint. A collecting hood is arranged opposite the funnel inlet and has a paint mist inlet opening, into which the smaller end of the tapered tube opens. An outlet gap is provided between the inlet opening of the collecting funnel and the collecting hood.

In an exemplary embodiment of the disclosure, an atomizer is positioned over a paint separating device during the paint changing operation and/or during the initial pressurized infeed of new coating material, with the paint mist which arises during this process being directed into the tapered tube. The tube widens from the inlet opening thereof, with the result that the velocity of the gas component of the paint mist decreases towards the end of the tapered tube as the cross section of the latter increases. However, the higher inertia of the paint particles means that the velocity thereof does not decrease, or at least decreases less, leading to the formation, at the bottom end of the tapered tube, of a paint mist in which the gas component has a reduced velocity and the paint particles or paint droplets contained therein have an increased velocity relative to the gas component. The larger the paint droplets, the greater is the difference in velocity relative to the surrounding gas.

Thus, the paint particles can enter the collecting funnel into which the tapered tube is directed, tending to follow a rectilinear flight path, whereas the gas is deflected in the direction of least resistance to flow, namely in the direction of the collecting hood. In this way, separation of the paint particles or paint droplets and the gas is brought about, this being desirable for separation of the larger diameter paint droplets, which can be problematic for a dry washout system. The separated liquid fractions of the coating material then leave via the funnel neck and are fed to a collecting vessel.

According to an exemplary embodiment of the paint mist separating device according to the disclosure, the collecting funnel has a shape extended in the manner of a tube at the inlet end thereof. In the case of a vertical alignment of the collecting funnel, this leads to an extended flow path for the deflected gas stream flowing upwards between the outer wall of the tapered tube and the inner wall of the collecting funnel. This can advantageously promote further separation of the smaller paint particles entrained by the air stream, and these then settle, at least in part, on the bottom of the collecting funnel owing to gravity and then emerge as waste paint at the outlet of the funnel and are directed into an appropriate collecting vessel.

According to an exemplary embodiment of the paint mist separating device according to the disclosure, the collecting funnel is surrounded along the axial extent thereof by a cylinder-like wall which is connected at one end to the protective hood, wherein a through-flow gap is formed in the radial direction between the funnel inlet and the cylinder-like wall. As a result, the upward-directed deflected gas stream is deflected again, being once again directed downwards. This can advantageously avoid a situation where the gas stream, which can still contain a residual fraction of very small paint particles, is directed into the paint booth, where it could lead to contamination of operating equipment or objects to be painted, for example.

According to another exemplary embodiment of the paint mist separating device according to the disclosure, a ring-like restriction element is arranged over the inlet opening. This is provided, for example, for the purpose of adapting the inlet opening to the external cross section of a respectively associated atomizer or to the geometry of the spray cone thereof. In the case of a change of color or an initial pressurized infeed operation, the atomizer should be positioned with the paint discharge side thereof a few millimeters above the inlet opening, for example, to ensure that the spray cone emanating from the atomizer is directed directly and completely into the inlet opening.

According to another exemplary embodiment of the disclosure, the angle of taper of the tapered tube is in an exemplary range of from 10° to 50°, giving an opening angle in an exemplary range of from 20° to 100°. As explained above, the reduction in the velocity of the gas in the tapered tube can be a significant component of the paint mist separating functionality according to an exemplary embodiment of the disclosure. This can be achieved by an appropriate widening of the tube. In this context, a length of a tapered tube can be in an exemplary range of from 40 cm to 80 cm, with the diameter of the inlet opening being 10-15 cm, for example.

According to an exemplary embodiment of the paint mist separating device according to the disclosure, the device can be manufactured at least partially from, for example, stainless steel. Stainless steel is found to be particularly resistant to paints and cleaning agents and is also particularly easy to clean.

A paint booth according to an exemplary embodiment of the disclosure includes at least one painting device and a dry separation device, wherein the device includes at least one paint mist separating device according to an exemplary embodiment of the disclosure. Using the paint mist separating device can avoid introduction of paint or solvent particles or droplets of relatively large diameter into the air supply of the paint booth, such as during a change of color and/or initial pressurized infeed of a new coating material. This allows the effective use of a dry separation system, by which the abovementioned advantages are achieved, for example, increased energy efficiency over a wet separation system.

According to an exemplary embodiment of a paint booth according to the disclosure, a painting robot is provided for carrying the at least one painting device. Painting robots, for example, articulated-arm robots with six degrees of freedom, are both suitable for guiding an atomizer in a reproducible movement over a workpiece to be painted and also capable of holding an atomizer over a paint mist separating device according to the disclosure during a change of color in such a way that the paint or solvent mist which arises is directed into the inlet opening. The paint mist separating device can be let into the floor of the booth or into the grating of the booth.

FIG. 1 shows an paint mist separating device 10 according to an exemplary embodiment of the disclosure in a cross-sectional side view. An atomizer 24 aligned along an axis of rotation 28 is positioned above the inlet opening of the paint mist separating device in order to carry out a change of color there. During the change of color, coating material of the previous hue, solvent and then coating material of the new hue can be first of all forced through the atomizer and atomized into relatively small paint droplets by the rotating atomizer bell 26. A guide air ring, from which an air stream directed downwards in a cone shape is blown through a multiplicity of holes arranged along a circular path, is provided directly downstream of the bell edge, as part of the atomizer 24. Together with the paint droplets or paint particles which arise at the bell edge of the atomizer bell through the rotation thereof, a paint mist can be formed, the cone-like flow of which is indicated by the dashed lines with the reference numeral 30. Owing to the switching operations during a change of color, for example, of the paint flow or of the speed of rotation of the atomizer bell, the droplet spectrum of the paint mist also contains relatively large paint droplets, which cannot be adequately filtered out when using a dry separation system for air cleaning or which lead to a significantly increased maintenance cycle of the painting installation.

The cone-like paint mist stream 30 is directed through the paint mist inlet opening of the paint mist separating device, into the interior of the latter. In order to adapt the paint mist inlet opening to the atomizer 24 or to the spray cone geometry thereof, a ring-type restriction element 40 is provided, which can also prevent upward blowback of the paint mist. The inlet opening is formed by the smaller opening of a tapered tube 12, which is arranged along the axis of rotation 28, the larger opening of which faces downwards and which projects into a collecting funnel 16, likewise aligned along the axis of rotation 28. In the lower region thereof, the collecting funnel 16 merges into a funnel neck 18, which is provided as an outflow opening for a liquid or separated liquid coating material, as indicated by the arrow with the reference numeral 36.

Owing to the conical widening of the tapered tube, which is defined by an angle of taper 38, the flow velocity of the gas component in the paint mist in the tapered tube 12 decreases towards the bottom. In the lower region of the collecting funnel, the paint mist is deflected upwards in accordance with the path of least resistance to flow, as indicated by the arrows with the reference numeral 32. However, depending on their size, the paint droplets or paint particles contained in the paint mist are not decelerated in their path velocity to the same extent as the gaseous component of the paint mist and thus move on a more rectilinear flight path in the direction of the bottom of the collecting funnel 16, where they are then deposited and then move in the direction of the funnel neck, where they are then fed to a collecting tank (not shown). The reduction according to the disclosure in the gas velocity can advantageously avoid excessive turbulence, which could negatively affect precipitation of the paint droplets or could even lead to blowback of the paint mist.

In the upper region thereof, the collecting funnel 16 has a shape 14 extended in the manner of a tube. This serves to extend the flow path 32 of the paint mist upwards and hence to promote a further gravity-induced precipitation of paint particles. Moreover, the flow cross section for the now upwardly directed gas or paint mist stream 32 is enlarged towards the top since there is then a flow around the outside wall of the tapered tube 12. As a result, the flow velocity of the gas component falls again and precipitation of paint particles is once again promoted.

In the upper region of the paint mist separating device, a collecting hood 20 ensures that the gas stream is once again deflected downwards, with an outlet gap 42 being provided between the upper edge of the collecting funnel and the collecting hood arranged transversely thereto, the gap having a cross section at least large enough to ensure that restriction of the flow cross section for the emerging gas stream is avoided. The collecting funnel is surrounded by a cylindrical wall 22, and a flow duct is formed between the outer collecting cylinder wall and the inner cylindrical wall. By virtue of the repeated deflection, the gas stream is then deflected downwards again, as indicated by the arrows with the reference numeral 34. This can advantageously avoid a situation where the gas or paint mist stream, which still contains relatively small paint particles, is directed into the paint booth and there possibly contaminates operating equipment or workpieces to be painted.

Figure 2:
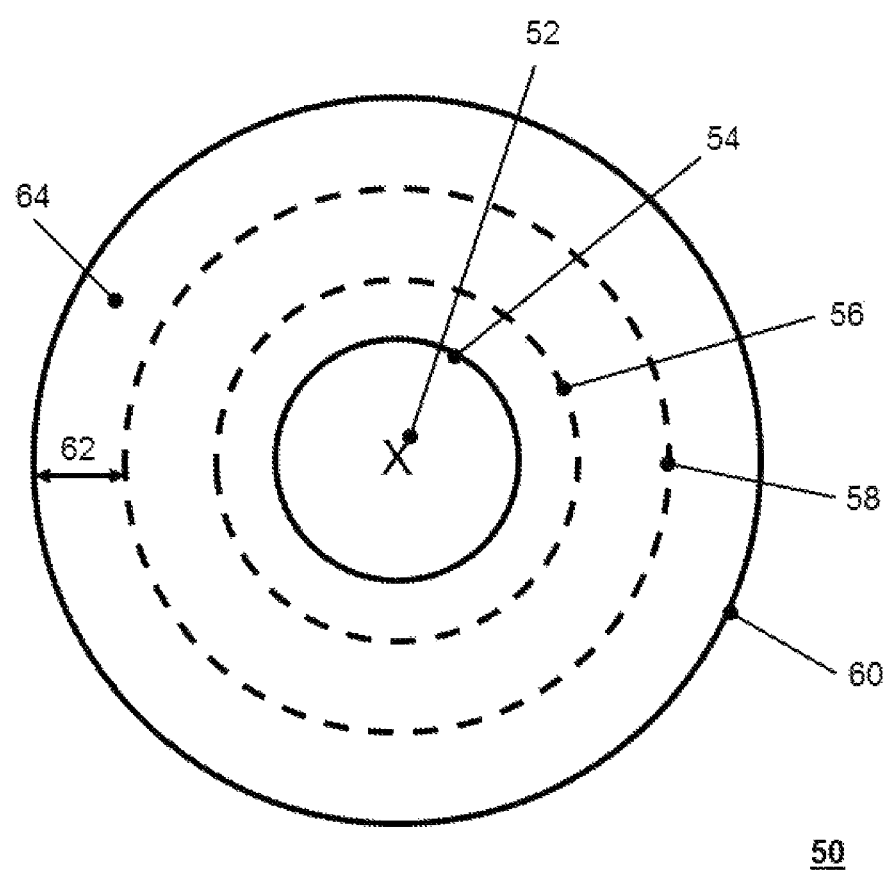
FIG. 2 shows an illustrative paint mist separating device according to an exemplary embodiment of the disclosure.

FIG. 2 shows an illustrative second paint mist separating device 50 according to an exemplary embodiment of the disclosure in a plan view. Arranged in a radially symmetrical manner along and around a virtual axis of rotation 52 is a tapered tube, the smaller opening 54 of which opens into a collecting hood 64 and the larger opening 56 of which projects into a collecting funnel 58. The collecting funnel 58 is surrounded radially by a cylinder-like wall, with a through-flow gap 62 being formed in the radial direction between the upper edge of the collecting funnel 58 and the cylinder-like wall.

Figure 3:
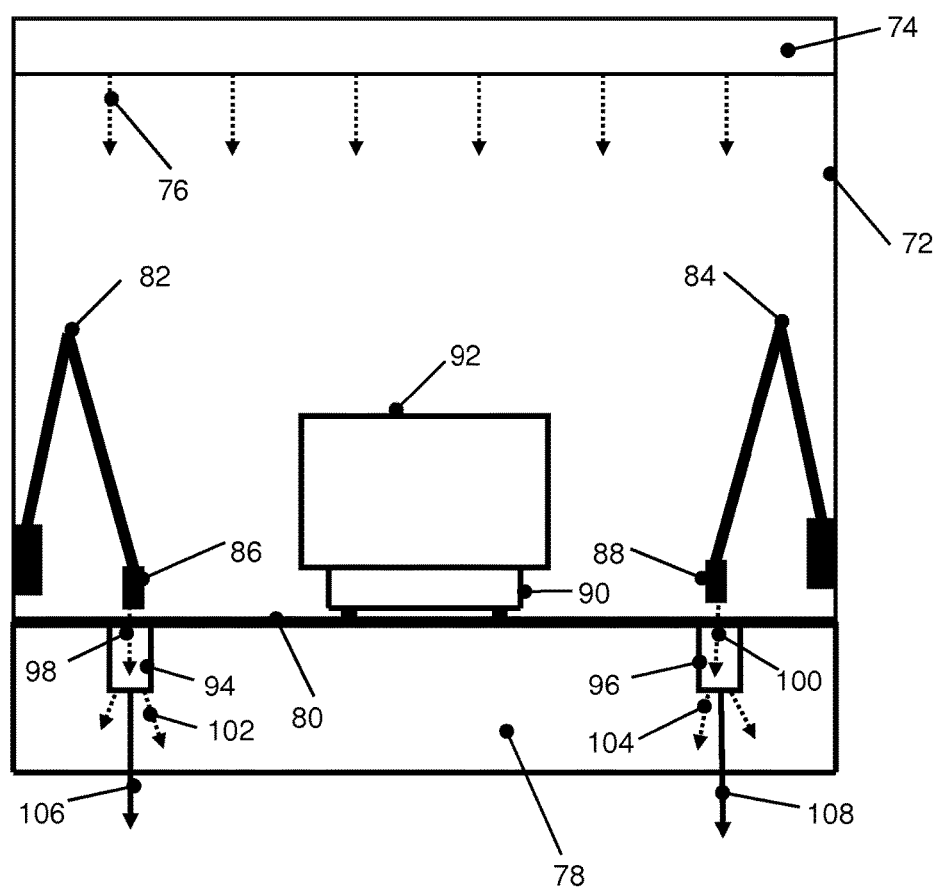
FIG. 3 shows an illustrative paint booth.

FIG. 3 shows an illustrative paint booth 70 according to an exemplary embodiment of the disclosure in a sectioned view. A painting space is formed between opposite booth walls 72, being closed off in the upper region thereof by an air conditioning system 74. Cleaned and air-conditioned ambient air is introduced into the painting space from the air conditioning system 74 above the entire floor area of the paint booth, as indicated by the arrows 76. The air 76 flows downwards and, in the process, absorbs paint mist arising, for example, during the painting of a workpiece. The booth air contaminated in this way flows through the booth floor 80, which can be manufactured as a steel girder structure into which gratings are inserted, into a dry separation system 78 situated underneath the booth floor 80. There, the ambient air from the booth is cleaned and, for example, the paint particles contained therein are removed and the cleaned ambient air is fed back to the air conditioning system 74, which then blows the air back into the painting zone.

In the paint booth, there are painting robots 82, 84, at the tips of the arms of which respective painting devices or atomizers 86, 88 are arranged. In this case, the painting robots can be assumed to be arranged on a traversing axis, allowing atomizers to be moved in the paint booth with a total of 7 degrees of freedom, in particular also around a workpiece to be painted, which is indicated schematically in this figure by the reference numeral 92. The workpiece 92 can be assumed to be a car body, for example, which is situated on a workpiece carrier 90 which, for its part, can be moved along the paint booth by a floor conveyor system (not shown).

Two paint mist separating devices 94, 96, into which the atomizers 86, 88 are directed in the case of a respective change of color, are let into the floor 80 of the paint booth. The paint mist which arises during the color change operation is indicated by arrows with the reference numerals 98, 100. Some of the paint particles contained in the paint mist 98, 100 are precipitated as liquid into the paint mist separating devices 94, 96 and are fed via a respective drain line to a collecting tank (not shown), as indicated by the arrows with reference numerals 106, 108. The paint mist 102, 104 reduced by the respective paint particles no longer has any relatively large paint particles or paint droplets and is introduced into the dry separation system 78. Owing to the fact that the relatively large paint droplets have now been reliably filtered out, reduced paint mist 102, 104 can be cleaned by the dry separation system 78 without problems.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SIGNS 10 illustrative first paint mist separating device
12 tapered tube 14 collecting funnel shape extended in a manner similar to a tube
16 collecting funnel
18 funnel neck
20 collecting hood
22 cylinder-like wall
24 atomizer
26 atomizer bell
28 axis of rotation
30 first paint mist stream
32 second paint mist stream
34 third paint mist stream
36 liquid
38 angle of taper
40 ring-type restriction element
42 outlet gap
50 illustrative second paint mist separating device
52 axis of rotation
54 smaller end of tapered tube
56 larger end of tapered tube
58 collecting funnel
60 cylinder-like wall
62 through-flow gap
64 collecting hood
70 illustrative paint booth
72 booth wall
74 air conditioning system
76 air stream
78 dry separation system
80 booth floor
82 first painting robot
84 second painting robot
86 first painting device
88 second painting device
90 workpiece carrier
92 workpiece
94 first paint mist separating device
96 second paint mist separating device
98 paint mist from first painting device
100 paint mist from second painting device
102 reduced paint mist from first painting device
104 reduced paint mist from second painting device
106 precipitated paint from first painting device
108 precipitated paint from second painting device

What is claimed is:

1. A paint mist separating device, comprising:
   a tapered tube;
   a collecting funnel with a funnel inlet and a funnel neck, a larger end of the tapered tube projecting toward the funnel neck, wherein the funnel neck is provided for connection to a collecting tank for paint; and
   a collecting hood arranged opposite the funnel inlet, the collecting hood having a paint mist inlet opening, into which a smaller end of the tapered tube opens, wherein an outlet gap is provided between the inlet opening of the collecting funnel and the collecting hood.

2. The paint mist separating device according to claim 1, wherein the collecting funnel has a shape extended as a tube at an inlet end thereof.

3. The paint mist separating device according to claim 1, wherein the collecting funnel is surrounded along an axial extent thereof by a cylindrical wall connected at one end to the protective hood, wherein a through-flow gap is formed in a radial direction between the funnel inlet and the cylindrical wall.

4. The paint mist separating device according to claim 1 comprising:
   a ringed restriction element arranged to construct the paint mist inlet opening.

5. The paint mist separating device according to claim 1, wherein an angle of taper of the tapered tube is in a range of from 10° to 50°.

6. The paint mist separating device according to claim 1, wherein the device is manufactured at least partially from stainless steel.

7. The paint mist separating device according to claim 1, in combination with an atomizer, wherein the tapered tube is arranged along an axis of rotation and the atomizer is aligned along the axis of rotation and positioned above the pain mist inlet opening.

8. A paint booth, comprising:
   at least one painting device; and
   a dry separation system including at least one paint mist separating device having:
      a tapered tube;
      a collecting funnel with a funnel inlet and a funnel neck, a larger end of the tapered tube projecting toward the funnel neck, wherein the funnel neck is provided for connection to a collecting tank for paint; and
      a collecting hood arranged opposite the funnel inlet, the collecting hood having a paint mist inlet opening, into which a smaller end of the tapered tube opens, wherein an outlet gap is provided between the inlet opening of the collecting funnel and the collecting hood.

9. The paint booth according to claim 8, wherein the collecting funnel has a shape extended as a tube at an inlet end thereof.

10. The paint booth according to claim 8, wherein the collecting funnel is surrounded along an axial extent thereof by a cylindrical wall connected at one end to the protective hood, wherein a through-flow gap is formed in a radial direction between the funnel inlet and the cylindrical wall.

11. The paint booth according to claim 8 comprising:
   a ringed restriction element arranged over the paint mist inlet opening.

12. The paint booth according to claim 8, wherein an angle of taper of the tapered tube is in a range of from 10° to 50°.

13. The paint booth according to claim 8, wherein the device is manufactured at least partially from stainless steel.

14. The paint booth according to claim 8, comprising:
   a painting robot provided for carrying the at least one painting device.

15. The paint booth according to claim 8, comprising:
   an atomizer wherein the tapered tube is arranged along an axis of rotation and the atomizer is aligned along the axis of rotation and positioned above the pain mist inlet opening.

* * * * *